United States Patent Office 3,848,055
Patented Nov. 12, 1974

3,848,055
EXTRACTION OF STRONTIUM VALUES FROM CELESTITE
Allan C. Kelly, Pleasanton, Calif., assignor to Kaiser Aluminum & Chemical Corporation, Oakland, Calif.
No Drawing. Filed July 13, 1973, Ser. No. 379,125
Int. Cl. C22b 3/00, 29/00; C01f 1/00, 11/00
U.S. Cl. 423—158                                                            10 Claims

ABSTRACT OF THE DISCLOSURE

Strontium hydroxide is produced directly from celestite ($SrSO_4$) by forming a slurry of finely divided celestite in a sodium hydroxide solution of such concentration that it contains at least 10 g./l. NaOH after reaction of the celestite with sodium hydroxide to form strontium hydroxide. The strontium hydroxide formed is washed to remove any sodium sulfate also precipitated, and then dissolved in hot water to separate solid impurities.

BACKGROUND OF THE INVENTION

It has been known for many years to extract strontium compounds such as the oxide, carbonate, hydroxide, and nitrate, from the strontium sulfate ($SrSO_4$) contained in celestite ore. However, recently developed uses for strontium compounds, for example, in glass for color television picture tubes and in permanent ceramic magnets, have caused a search for more efficient methods of extracting strontium values from natural ores, and for methods which can be used to extract strontium from lower grade ores.

Prior processes for extracting strontium values from celestite ore include the black ash process, wherein celestite is calcined in the presence of carbon to form strontium sulfide which is then dissolved in water. Another prior process converts strontium sulfate to strontium carbonate by reaction with sodium carbonate, and purifies the strontium carbonate by calcination and slaking the resulting SrO to form strontium hydroxide. It is also known to dissolve barium or strontium sulfate in fused sodium hydroxide at elevated temperatures, the resulting barium or strontium hydroxide being extracted from the solidified fusion with an ethylene glycol and methanol solvent, as set forth in U.S. Pat. 2,225,633.

These previous processes all involve the use of relatively high temperatures, whereas the process of this invention enables the production of strontium hydroxide from celestite by aqueous processes carried out below the temperature of boiling water.

SUMMARY OF THE INVENTION

It has now been found, according to this invention, that strontium hydroxide can be produced from celestite by (a) reacting a finely divided celestite with sufficient aqueous sodium hydroxide solution to form a slurry, the solution containing sufficient NaOH to maintain a concentration of at least 10 g./l. NaOH after reaction of the sodium hydroxide in the solution with the celestite to form strontium hydroxide, the reaction being carried out at a temperature below the boiling point of water;
(b) separating the solid material resulting from step (a) from the aqueous solution;
(c) washing the solid material separated in step (b) to dissolve and remove any solid sodium sulfate present;
(d) dissolving the strontium hydroxide in the washed solid material produced in step (c) in water at a temperature of at least 90° C.;
(e) separating the strontium hydroxide solution produced in step (d) from the remaining solids; and
(f) recovering strontium values from the separated solution.

DETAILED DESCRIPTION

The celestite used may be either a natural ore, or an ore which has been beneficiated, for example by froth flotation. Preferably all the celestite passes a 100 mesh screen and at least 30% passes a 325 mesh screen. This sizing may be achieved by grinding a high purity natural ore, or may result from the grinding performed prior to froth flotation of a lower grade ore. It will be understood that generally the finer the celestite ore, the more rapidly it will react with the sodium hydroxide to form strontium hydroxide.

The amount of the sodium hydroxide solution used to slurry the celestite will be adequate to produce a readily agitated slurry. While relatively dilute slurries can be used, for efficiency one will use as high a concentration of solids as is consistent with getting good stirring action. For example, a slurry of 100 grams of celestite ore in 1 liter of sodium hydroxide solution has been successfully used.

The concentration of the sodium hydroxide solution is chosen so that after the strontium sulfate and other constituents (for example $BaSO_4$) in the celestite ore have reacted with the sodium hydroxide to form strontium hydroxide or other hydroxides (for example $Ba(OH)_2$), the concentration of the solution will still be at least 10 g./l. NaOH, and preferably will be at least 30 g./l. NaOH. Again, for the sake of efficiency, much higher concentrations, for example 250 g./l., will ordinarily be used.

The reason for maintaining a certain minimum concentration of sodium hydroxide in the aqueous solution is that the solubility of strontium hydroxide in sodium hydroxide solution is much lower at higher concentrations, being for example about 0.5 g./l. at an NaOH concentration of 30 g./l. and as low as 0.1 g./l. at an NaOH concentration of 300 g./l.

Digestion of the celestite ore is carried out at a temperature below the boiling point of water, preferably below 50° C. and most preferably below 20° C., since the solubility of strontium hydroxide increases rapidly with increasing temperature. For example it is about 25 g./l. in 50° C. water, but less than 10 g./l. in 20° C. water. The objective of the digestion reaction is to precipitate as much strontium hydroxide as possible, probably as the octahydrate, while at the same time taking into solution as much sodium sulfate ($Na_2SO_4$) as possible.

Although the solubility of sodium sulfate in a sodium hydroxide solution is much greater than that of strontium hydroxide, it is still relatively limited and also decreases as the concentration of the sodium hydroxide solution increases. For example, at 25° C. the solubility of sodium sulfate in 150 g./l. NaOH is about 200 g./l. and drops to about 50 g./l. for a sodium hydroxide solution of 300 g./l. concentration. Accordingly, if it is desired that all the sodium sulfate produced by digestion of the celestite go into solution, relatively dilute sodium hydroxide, within the limits set forth above, will be used. However, as previously explained, it will generally be more efficient to operate at higher sodium hydroxide concentrations, and under these conditions the solution will become saturated with sodium sulfate, the excess sodium sulfate produced being precipitated along with the solid strontium hydroxide and undigested impurities from the celestite ore.

It is also possible to add a source of sodium ion, for example sodium chloride, to the sodium hydroxide solution to increase the sodium ion concentration and thus salt out solid sodium sulfate, as is well known. The advantage of this approach is that sodium chloride is a much cheaper source of sodium ion than is sodium hydroxide. However, the concentration of sodium hydroxide specified above must be maintained in order to prevent any significant amounts of strontium hydroxide remaining in solution after the digestion.

In addition to promoting the rate of reaction by using finely divided celestite, it has been found that carrying out the reaction in the presence of attrition, for example in a rotating chamber containing rods or balls, also enhances the rate of reaction.

After the digestion reaction, the sodium hydroxide solution is separated from the solids, principally precipitated strontium hydroxide (probably in the form of the octahydrate), solid impurities, and any excess sodium sulfate produced. While it is possible to discard the spent hydroxide solution, and use fresh solution for the next batch of ore processed, it will generally be found more economic to reuse the solution after adding sodium hydroxide to make up for that consumed in the reaction and, if desired, removing sodium sulfate from the solution by known methods, for example by evaporating the solution to concentrate it and salt out the $Na_2SO_4$.

It will be understood that, if desired, a sodium hydroxide solution which is already saturated in sodium sulfate can be used for the digestion, in which case all the sodium sulfate produced will be precipitated along with the strontium hydroxide.

In any case, the solids removed from the sodium hydroxide solution will be washed, for example with water, to remove any adhering sodium hydroxide solution and, more importantly, to dissolve any solid sodium sulfate produced in the main reaction. This washing will be done at as low a temperature as possible in order to minimize dissolution of the solid strontium hydroxide. In general, the temperature of this washing should not exceed the temperature used in the digestion step, and may be even lower. Depending on the conditions of the digestion operation, it may prove economic to recover sodium sulfate from this wash water, but generally the amount of sodium hydroxide in it will be too little to be worth recovering.

The solids remaining after the wash are mainly strontium hydroxide and solid impurities from the celestite ore. These are separated by dissolving the strontium hydroxide in water at high temperatures, at least 90° C. and preferably as close to the boiling point as practical. Dissolution of the strontium hydroxide under pressure is possible, but will generally not be necessary. A minimum amount of water will be used to dissolve the strontium hydroxide present. The hot strontium hydroxide solution is then separated from the solid impurities, for example $SiO_2$, $Fe_2O_3$, and the like.

Finally, the hot strontium hydroxide solution can be treated in various ways to extract its strontium values. For example, it can be cooled to precipitate strontium hydroxide octahydrate ($Sr(OH)_2 \cdot 8H_2O$). Alternatively, it may be carbonated, for example with $CO_2$, to precipitate strontium carbonate. Likewise, it can be reacted with nitric acid to produce strontium nitrate.

Example

Froth flotation was used to beneficiate a celestite ore from about 50% $SrSO_4$ to about 85% $SrSO_4$. The beneficiated ore showed the following typical analysis: 49.0% SrO, 2.2% BaO, 3.0% CaO, 2.0% $SiO_2$, 0.5% $Al_2O_3$, 0.4% $Fe_2O_3$, 0.1% $K_2O$, and (by difference) 42.8% $SO_4$ and $CO_2$. It can be calculated from this analysis that the ore contained about 87% $SrSO_4$, about 3.4% $BaSO_4$, and about 5.4% $CaCO_3$, the balance being minerals such as quartz, kaolin, hematite, and the like.

The concentrate substantially all passed a 65 mesh screen and about 35% was −325 mesh. 40 grams of this concentrate were added to 400 ml. of a 306 g./l. NaOH solution in a 650 ml. polyethylene bottle. Two stainless steel rods 10 cm. long by 1 cm. in diameter were inserted, the bottle sealed, and rotated on a roller for 72 hours. The steel rods were removed and the contents of the bottle filtered and then washed with about 300 ml. alcohol, followed by about 100 ml. acetone. About 60 g. of dried solids were recovered. About 10 g. of the dried solids were added to 100 ml. of 300 g./l. NaOH, mixed, centrifuged, and the clear liquor decanted. This was repeated with NaOH solution, 0° C. water, and then twice with alcohol. After this washing the solids were leached with hot water, filtered, and repeatedly washed with hot (80–90° C.) water, using a total of about 1 liter. The leachate was carbonated with $CO_2$ to produce solid strontium carbonate, cooled to 16° C. and the solids filtered, producing 4.4 g. $SrCO_3$. Calculation indicated that about 94% of the strontium values in the celestite digested were recovered in the strontium carbonate. It can also be calculated that the 60 g. of solids obtained by digestion of 40 g. of ore contained about 50 g. $Sr(OH)_2 \cdot 8H_2O$, 5 g. $Na_2SO_4$, and 5 g. impurities.

The careful washings of the example were used because it was desired to make a quantitative determination of the yield of the process; in a commercial operation, less care would be needed since quantitative recovery is not necessary.

In the specification and claims, percentages and parts are by weight unless otherwise indicated. Mesh sizes referred to herein are Tyler standard screen sizes which are defined in Chemical Engineers' Handbook, John H. Perry, Editor-in-Chief, Third Edition, 1950, published by McGraw Hill Book Company, at page 963. For example, a 100 mesh screen opening corresponds to 147 microns, and 325 mesh to 44 microns. Analyses of mineral components are reported in the usual manner, expressed as simple oxides, e.g. $Al_2O_3$ and $SiO_2$, although the components may actually be present in various combinations, e.g. as an aluminum silicate.

What is claimed is:

1. Method of producing strontium hydroxide from strontium sulfate comprising:
   (a) reacting a finely divided celestite with sufficient aqueous sodium hydroxide solution to form a slurry, the solution containing sufficient NaOH to maintain a concentration of at least 10 g./l. NaOH after reaction of the sodium hydroxide in the solution with the celestite to form strontium hydroxide, the reaction being carried out at a temperature below the boiling point of water;
   (b) separating the solid material resulting from step (a) from the aqueous solution;
   (c) washing the solid material separated in step (b) to dissolve and remove any solid sodium sulfate present; said washing being conducted at a temperature of not greater than that of the reaction of step (a);
   (d) dissolving the strontium hydroxide in the washed solid material produced in step (c) in water at a temperature of at least 90° C.;
   (e) separating the strontium hydroxide solution produced in step (d) from the remaining solids; and
   (f) recovering strontium values from the separated solution.

2. Method according to claim 1 wherein the reaction of step (a) is carried out at a temperature not over 50° C.

3. Method according to claim 1 wherein the aqueous solution contains sufficient NaOH to maintain a concentration of at least 30 g./l. NaOH after the reaction.

4. Method according to claim 3 wherein the reaction of step (a) is carried out at a temperature not over 50° C.

5. Method according to claim 4 wherein the celestite is subjected to attrition during the reaction of step (a).

6. Method according to claim 1 wherein the celestite is subjected to attrition during the reaction of step (a).

7. Method according to claim 1 wherein the aqueous solution contains sufficient NaOH to maintain a concentration of at least 250 g./l. NaOH after the reaction.

8. Method according to claim 7 wherein the reaction of step (a) is carried out at a temperature not over 50° C.

9. Method according to claim 8 wherein the celestite is subjected to attrition during the reaction of step (a).

10. Method according to claim 9 wherein the reaction of step (a) is carried out at a temperature not over 50° C.

References Cited

UNITED STATES PATENTS 2,225,633  12/1940  Hill et al. ---------- 423—163

FOREIGN PATENTS 220,971  1968  U.S.S.R. ------------ 423—164

OTHER REFERENCES

Kirk-Othmer, "Encyclopedia of Chemical Technology," 1969, pp. 52–54; vol. 19.

OSCAR R. VERITZ, Primary Examiner

E. R. CROSS, Assistant Examiner

U.S. Cl. X.R.

423—638